(12) United States Patent
Pischl et al.

(10) Patent No.: US 10,135,626 B2
(45) Date of Patent: Nov. 20, 2018

(54) POWER COUPLING CIRCUITS FOR SINGLE-PAIR ETHERNET WITH AUTOMOTIVE APPLICATIONS

(71) Applicant: Broadcom Corporation, Irvine, CA (US)

(72) Inventors: Neven Pischl, Santa Clara, CA (US); Ahmad Chini, Mission Viejo, CA (US); Sesha Panguluri, Cupertino, CA (US); Mehmet Vakif Tazebay, Irvine, CA (US); Mohammad Tabatabai, Newport Beach, CA (US)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 86 days.

(21) Appl. No.: 15/098,251

(22) Filed: Apr. 13, 2016

(65) Prior Publication Data

US 2016/0308683 A1  Oct. 20, 2016

Related U.S. Application Data

(60) Provisional application No. 62/147,550, filed on Apr. 14, 2015, provisional application No. 62/293,720, filed on Feb. 10, 2016.

(51) Int. Cl.
*H04B 15/00* (2006.01)
*H04L 12/10* (2006.01)

(52) U.S. Cl.
CPC .................................. *H04L 12/10* (2013.01)

(58) Field of Classification Search
CPC ........ H04B 2203/5483; H04B 25/0266; H04B 3/56; H04B 2203/5491; H04B 3/542; H04L 25/0266
USPC ................. 375/219–223, 257–285, 295–352
See application file for complete search history.

(56) References Cited

U.S. PATENT DOCUMENTS

| | | | | |
|---|---|---|---|---|
| 4,347,618 A | * | 8/1982 | Kavouras | G01S 7/4004 342/26 D |
| 4,479,228 A | * | 10/1984 | Crane | H04L 12/40176 375/219 |
| 4,493,092 A | * | 1/1985 | Adams | H04L 25/4925 375/257 |
| 4,507,793 A | * | 3/1985 | Adams | H04L 5/1423 375/257 |
| 4,583,232 A | * | 4/1986 | Howell | H04L 27/02 370/276 |
| 5,127,046 A | * | 6/1992 | Malm | H04M 11/06 375/222 |

(Continued)

*Primary Examiner* — James M Perez
(74) *Attorney, Agent, or Firm* — Morgan, Lewis & Bockius LLP

(57) ABSTRACT

A circuit for power on data line (PoDL) injection includes a power source, a first and a second coupling component, and an interface. The power source provides one or more DC voltage levels. The first coupling component couples the power source to an interface for coupling to a transmission medium. An Ethernet device is coupled through the second coupling component to the interface. The first coupling component is a balanced component, and the Ethernet device is isolated from the power source via a pair of DC blocking capacitors connected between the first coupling component and the second coupling component.

20 Claims, 7 Drawing Sheets

(56) References Cited

U.S. PATENT DOCUMENTS

| | | | | |
|---|---|---|---|---|
| 5,675,609 A * | 10/1997 | Johnson | H03K 7/00 | 329/311 |
| 5,802,169 A * | 9/1998 | Frantz | H04M 3/005 | 375/222 |
| 6,243,426 B1 * | 6/2001 | Lo | H04L 25/0266 | 341/68 |
| 6,259,745 B1 * | 7/2001 | Chan | H04B 3/23 | 370/294 |
| 6,373,886 B1 * | 4/2002 | Moon | G06F 1/26 | 375/220 |
| 6,415,003 B1 * | 7/2002 | Raghavan, Sr. | H04L 25/061 | 327/307 |
| 6,459,739 B1 * | 10/2002 | Vitenberg | H04B 3/30 | 333/12 |
| 6,492,880 B1 * | 12/2002 | Chiappe | H04L 25/0266 | 333/22 R |
| 6,765,931 B1 * | 7/2004 | Rabenko | H04B 3/23 | 348/E7.049 |
| 6,804,304 B1 * | 10/2004 | Chan | H04L 12/10 | 375/222 |
| 6,850,618 B1 * | 2/2005 | Mohajeri | H04M 11/062 | 375/222 |
| 6,912,209 B1 * | 6/2005 | Thi | H04B 3/23 | 370/286 |
| 6,975,209 B2 * | 12/2005 | Gromov | H04B 3/548 | 370/241 |
| 7,023,868 B2 * | 4/2006 | Rabenko | H04B 3/23 | 348/E7.049 |
| 7,092,043 B2 * | 8/2006 | Vorenkamp | H01F 17/0006 | 257/E27.046 |
| 7,180,951 B2 * | 2/2007 | Chan | H04B 3/23 | 375/257 |
| 7,200,176 B1 * | 4/2007 | Paulos | H04L 25/0266 | 307/128 |
| 7,474,704 B2 * | 1/2009 | Lum | H04L 12/10 | 375/257 |
| 7,492,291 B2 * | 2/2009 | Murray | H03M 5/145 | 341/100 |
| 7,587,001 B2 * | 9/2009 | Hazani | H04B 7/15542 | 235/462.46 |
| 7,711,967 B2 * | 5/2010 | Woo | G06F 1/266 | 340/12.36 |
| 7,793,137 B2 * | 9/2010 | Karam | H04L 1/22 | 714/4.12 |
| 7,933,295 B2 * | 4/2011 | Thi | H04B 3/23 | 370/352 |
| 8,155,012 B2 * | 4/2012 | Austermann, III | H04B 3/54 | 370/241 |
| 8,472,532 B2 * | 6/2013 | Schley-May | H04B 3/02 | 375/257 |
| 8,582,271 B2 * | 11/2013 | Bertin | G06F 1/26 | 323/277 |
| 8,860,242 B1 * | 10/2014 | Pruett | H02J 4/00 | 307/5 |
| 8,929,468 B1 * | 1/2015 | Voigt | H04B 3/42 | 336/177 |
| 8,935,542 B2 * | 1/2015 | Diab | H01R 13/66 | 713/300 |
| 8,942,107 B2 * | 1/2015 | Austerman, III | H04B 3/54 | 370/241 |
| 9,059,776 B1 * | 6/2015 | Jimenez de Parga | H04B 3/30 | |
| 9,177,157 B2 * | 11/2015 | Binder | H04L 63/18 | |
| RE46,142 E * | 9/2016 | Thi | H04B 3/23 | |
| 9,602,317 B1 * | 3/2017 | Hailu | H04L 25/03885 | |
| 9,606,615 B2 * | 3/2017 | Van Der Zanden | H04L 12/10 | |
| 9,609,706 B2 * | 3/2017 | Crenshaw | H02J 7/0021 | |
| 2002/0057017 A1 * | 5/2002 | Chan | H04L 25/0266 | 307/18 |
| 2002/0180592 A1 * | 12/2002 | Gromov | H04B 3/548 | 370/200 |
| 2002/0181675 A1 * | 12/2002 | Venkataraman | H04L 27/0002 | 379/93.01 |
| 2003/0006881 A1 * | 1/2003 | Reyes | H04B 3/54 | 375/259 |
| 2003/0035472 A1 * | 2/2003 | Mouton | H04L 5/20 | 375/222 |
| 2003/0206604 A1 * | 11/2003 | Lai | H04L 25/063 | 375/350 |
| 2004/0085193 A1 * | 5/2004 | Crowell | B23D 59/008 | 700/83 |
| 2004/0234000 A1 * | 11/2004 | Page | H04J 3/00 | 375/259 |
| 2004/0257743 A1 * | 12/2004 | Chen | H02H 9/04 | 361/119 |
| 2005/0076148 A1 * | 4/2005 | Chan | H04B 3/542 | 709/246 |
| 2005/0084031 A1 * | 4/2005 | Rosen | H04B 1/69 | 375/295 |
| 2005/0084032 A1 * | 4/2005 | Rosen | H04B 1/7163 | 375/295 |
| 2005/0084033 A1 * | 4/2005 | Rosen | H04B 1/69 | 375/295 |
| 2005/0281326 A1 * | 12/2005 | Yu | H04B 3/44 | 375/222 |
| 2006/0034376 A1 * | 2/2006 | Rakshani | G06F 1/266 | 375/257 |
| 2006/0077888 A1 * | 4/2006 | Karam | H04L 1/22 | 370/216 |
| 2006/0092826 A1 * | 5/2006 | Karam | H04L 1/22 | 370/216 |
| 2006/0115007 A1 * | 6/2006 | Karam | H04L 12/10 | 375/257 |
| 2006/0153307 A1 * | 7/2006 | Brown | H04L 1/0002 | 375/257 |
| 2006/0185876 A1 * | 8/2006 | Aviv | G06F 1/16 | 174/50 |
| 2006/0185877 A1 * | 8/2006 | Soffer | H02G 3/123 | 174/50 |
| 2006/0193110 A1 * | 8/2006 | Chan | G06F 1/26 | 361/679.41 |
| 2006/0262713 A1 * | 11/2006 | Karam | H04L 12/10 | 370/200 |
| 2006/0273661 A1 * | 12/2006 | Toebes | G06F 1/266 | 307/106 |
| 2007/0009051 A1 * | 1/2007 | Maschera | H03H 11/40 | 375/258 |
| 2007/0025452 A1 * | 2/2007 | Schindler | H04B 3/44 | 375/257 |
| 2007/0076676 A1 * | 4/2007 | Shiba | H04B 3/542 | 370/339 |
| 2007/0087722 A1 * | 4/2007 | Ichihara | H04B 3/54 | 455/343.1 |
| 2007/0127591 A1 * | 6/2007 | Chan | H04B 3/54 | 375/296 |
| 2007/0229231 A1 * | 10/2007 | Hurwitz | H04B 3/54 | 455/402 |
| 2008/0122448 A1 * | 5/2008 | Pischl | G01R 27/06 | 324/600 |
| 2008/0137759 A1 * | 6/2008 | Cai | H04L 25/0266 | 375/257 |
| 2008/0165463 A1 * | 7/2008 | Chan | H04B 3/542 | 361/93.1 |
| 2008/0181316 A1 * | 7/2008 | Crawley | H04L 12/10 | 375/258 |
| 2008/0267212 A1 * | 10/2008 | Crawley | H05K 9/0066 | 370/463 |
| 2008/0276104 A1 * | 11/2008 | Hussain | G06F 1/266 | 713/300 |
| 2009/0143010 A1 * | 6/2009 | Fukuda | H04B 3/54 | 455/41.1 |
| 2009/0154594 A1 * | 6/2009 | Yeh | H04B 3/54 | 375/295 |
| 2009/0207924 A1 * | 8/2009 | Chan | H04B 3/54 | 375/260 |
| 2009/0327558 A1 * | 12/2009 | Landry | G06F 13/4072 | 710/301 |
| 2010/0033165 A1 * | 2/2010 | Rostamzadeh | G01R 31/001 | 324/127 |

(56) References Cited

U.S. PATENT DOCUMENTS

| | | | |
|---|---|---|---|
| 2010/0182024 A1* | 7/2010 | Yu | G01R 27/04 324/713 |
| 2010/0191525 A1* | 7/2010 | Rabenko | H04B 3/23 704/211 |
| 2010/0218003 A1* | 8/2010 | Blaha | H04L 12/10 713/300 |
| 2010/0254379 A1* | 10/2010 | Fukuda | H04B 5/0075 370/389 |
| 2010/0260247 A1* | 10/2010 | Albiston | H04B 3/548 375/222 |
| 2011/0164364 A1* | 7/2011 | Baum | H04B 3/542 361/679.02 |
| 2011/0217873 A1* | 9/2011 | Diab | H01R 13/66 439/620.01 |
| 2011/0243254 A1* | 10/2011 | Pischl | H04L 25/0276 375/257 |
| 2012/0015552 A1* | 1/2012 | Diab | H04L 12/10 439/488 |
| 2012/0166582 A1* | 6/2012 | Binder | H04L 63/18 709/217 |
| 2013/0142231 A1* | 6/2013 | Schwager | H04B 3/54 375/222 |
| 2013/0191655 A1* | 7/2013 | Schlichter | H04L 12/10 713/300 |
| 2014/0037077 A1* | 2/2014 | Marchetti | H04B 3/02 379/93.06 |
| 2014/0092724 A1* | 4/2014 | Lontka | G01R 31/025 370/221 |
| 2014/0103707 A1* | 4/2014 | Maymon | H04L 12/10 307/2 |
| 2014/0111180 A1* | 4/2014 | Vladan | H04L 12/413 323/312 |
| 2014/0136874 A1* | 5/2014 | Diab | G06F 1/28 713/340 |
| 2014/0258738 A1* | 9/2014 | Greenwalt | G06F 1/3206 713/300 |
| 2014/0320230 A1* | 10/2014 | Jooyaie | H03H 7/42 333/25 |
| 2015/0160719 A1* | 6/2015 | Van Der Zanden | H04L 12/10 713/322 |
| 2015/0188589 A1* | 7/2015 | Wu | H04B 1/38 375/219 |
| 2015/0312048 A1* | 10/2015 | Bodo | H02J 13/0062 713/300 |
| 2015/0334186 A1* | 11/2015 | Chen | H04L 67/12 348/143 |
| 2016/0064924 A1* | 3/2016 | Wiese | H04L 12/10 361/119 |
| 2016/0187951 A1* | 6/2016 | Buckmeier | G06F 1/266 713/300 |
| 2016/0205224 A1* | 7/2016 | Chini | H04L 69/08 455/422.1 |
| 2016/0211996 A1* | 7/2016 | Mittelsteadt | H04L 27/26 |
| 2016/0241406 A1* | 8/2016 | Darshan | H04L 12/10 |
| 2016/0308683 A1* | 10/2016 | Pischl | H04L 12/10 |
| 2017/0026188 A1* | 1/2017 | Herzel | H04L 12/10 |
| 2017/0187472 A1* | 6/2017 | Chini | H04B 15/005 |
| 2017/0229860 A1* | 8/2017 | Vakilian | H02J 1/00 |
| 2017/0324251 A1* | 11/2017 | Hacker | H02J 4/00 |
| 2017/0346661 A1* | 11/2017 | McCarthy | H04L 25/0278 |
| 2018/0024620 A1* | 1/2018 | Gardner | H04B 3/54 713/323 |

* cited by examiner

POWER COUPLING CIRCUITS FOR SINGLE-PAIR ETHERNET WITH AUTOMOTIVE APPLICATIONS

CROSS-REFERENCE TO RELATED APPLICATIONS

This application claims the benefit of priority under 35 U.S.C. § 119 from U.S. Provisional Patent Application 62/147,550 filed Apr. 14, 2015 and U.S. Provisional Patent Application 62/293,720 filed Feb. 10, 2016, which are incorporated herein by reference in their entirety.

TECHNICAL FIELD

The subject technology generally relates to the Ethernet, in particular, relates to power coupling circuits for single-pair Ethernet with automotive applications.

BACKGROUND

Many installed local area networks (LANs) use Ethernet technology. As a link layer protocol in the TCP/IP stack, Ethernet describes how networked devices should format data for transmission to other network devices on the same segment of a network, and how to prepare output data for sending over the network. Ethernet touches both the physical layer (e.g., Layer 1) and the data link layer (e.g., Layer 2) on the open system interconnection (OSI) network protocol model. Packet and frame are two defined units of transmission in Ethernet protocol. An Ethernet frame includes a payload of data being transmitted and addressing information that can identify the physical media access control (MAC) addresses of both sender and receiver. Other information content of the Ethernet frame includes virtual LAN (VLAN) tagging and quality of service information and error-correction information, which can be useful in detecting transmission problems. Each Ethernet frame can be wrapped in an Ethernet packet that can affix several bytes of information used in establishing the connection and marking where the frame starts.

Automotive Ethernet has gained momentum in recent years. For example, Ethernet over single-pair balanced cabling is specified in the IEEE standards 100BASE-T1 and 1000BASE-T1. One of the valued features of these standards is the ability to pass power over same single pair where data is transmitted. Power over data line (PoDL) can be achieved by injecting and collecting power in the lower frequency band. A coupling circuit can be used to inject power into the data line and separate it from the data. Balancing requirement of the data line for emission and noise immunity and electromagnetic compatibility (EMC) can make the coupling circuit design complicated, especially for unshielded twisted pair (UTP) cables.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Methods and configurations for providing power-coupling circuits for single-pair Ethernet with automotive applications are described. The subject technology includes a number of advantageous features. For example, one or more power over data line (PoDL) circuits for automotive applications over unshielded twisted pair (UTP) cables is provided with better balance on the cable side of a common-mode chock (CMC). The PoDL circuits of the subject disclosure satisfy electromagnetic compatibility (EMC) requirements of 1000BASE-T1 and 100BASE-T1 standards. The subject technology, while providing for EMC requirements, allows implementing the PoDL circuit with fewer components. An optional high-voltage (e.g., 48 Volt (V), or 24V) version of the PoDL architecture allows achieving a lower size and weight circuit. Alternative PoDL coupling circuit designs for coaxial and shielded twisted pair (STP) cables are also provided. The disclosed solution provide architectures with reduced component requirements (e.g., no additional CMC for power path).

Figure 1A:
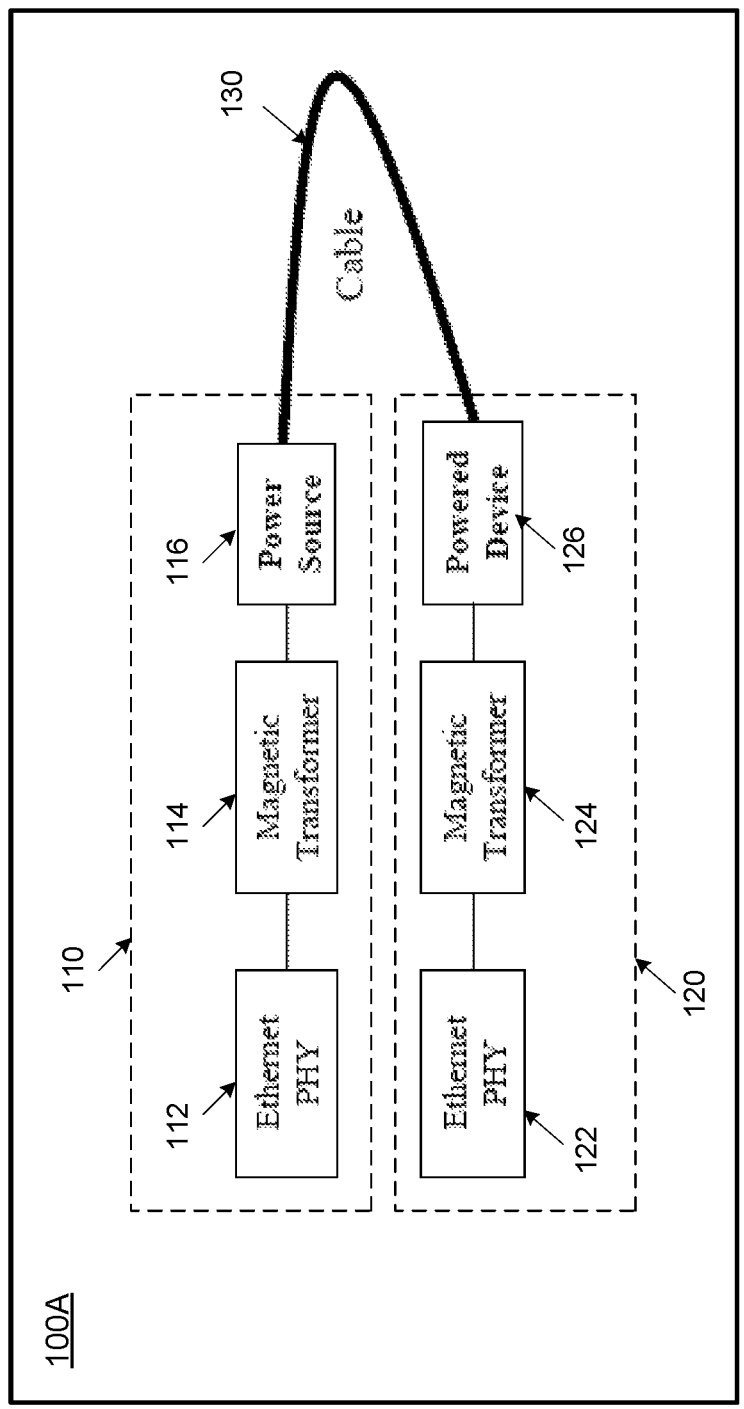
FIG. 1A illustrates an example of a high-level block diagram for a power over Ethernet (POE) system architecture in accordance with one or more implementations.

FIG. 1A illustrates an example of a high-level block diagram for a power over Ethernet (POE) system architecture 100A in accordance with one or more implementations of the subject technology. The POE system architecture 100A includes a power-source circuit 110, a power-receiving circuit 120, and a transmission medium (e.g., a cable) 130. The transmission medium 130, in addition to communicating data between the power-source circuit 110 and power-receiving unit 120, is responsible for delivery of power from the power-source circuit 110 to the power-receiving circuit 120. In some aspects, the power-source circuit 110 includes a first Ethernet device 112 (e.g., an Ethernet physical (PHY) device), a first coupling circuit 114 (e.g., a magnetic transformer), and a power source 116. For example, the Ethernet PHY device 112 may be a PHY circuit of a network switch that is powered by the power source 116 and is capable of providing power and data over the transmission medium 130 to another network device such as power-receiving circuit 120. The coupling circuit 114 can be a magnetic transformer that isolates the DC power form the first Ethernet PHY device.

The power-receiving circuit 120 includes a second Ethernet device 122, a second coupling circuit 124 (e.g., a magnetic transformer), and a powered device 126. The Ethernet PHY device 122 may be a PHY circuit of a network device (e.g., set-to-box, a television, a desktop computer, a laptop, or other network device). The powered device 126, also referred to as a load, is powered by the power source 116 through the transmission medium 130, and provides the received power to the second Ethernet device 122. The coupling circuit 124 can be a magnetic transformer that isolates the DC power form the second Ethernet PHY device as will be explained in more details herein. As shown in FIG. 1A, the power source 116 and the powered device 126 are on the cable side of magnetic transformers 114 and 124.

Figure 1B:
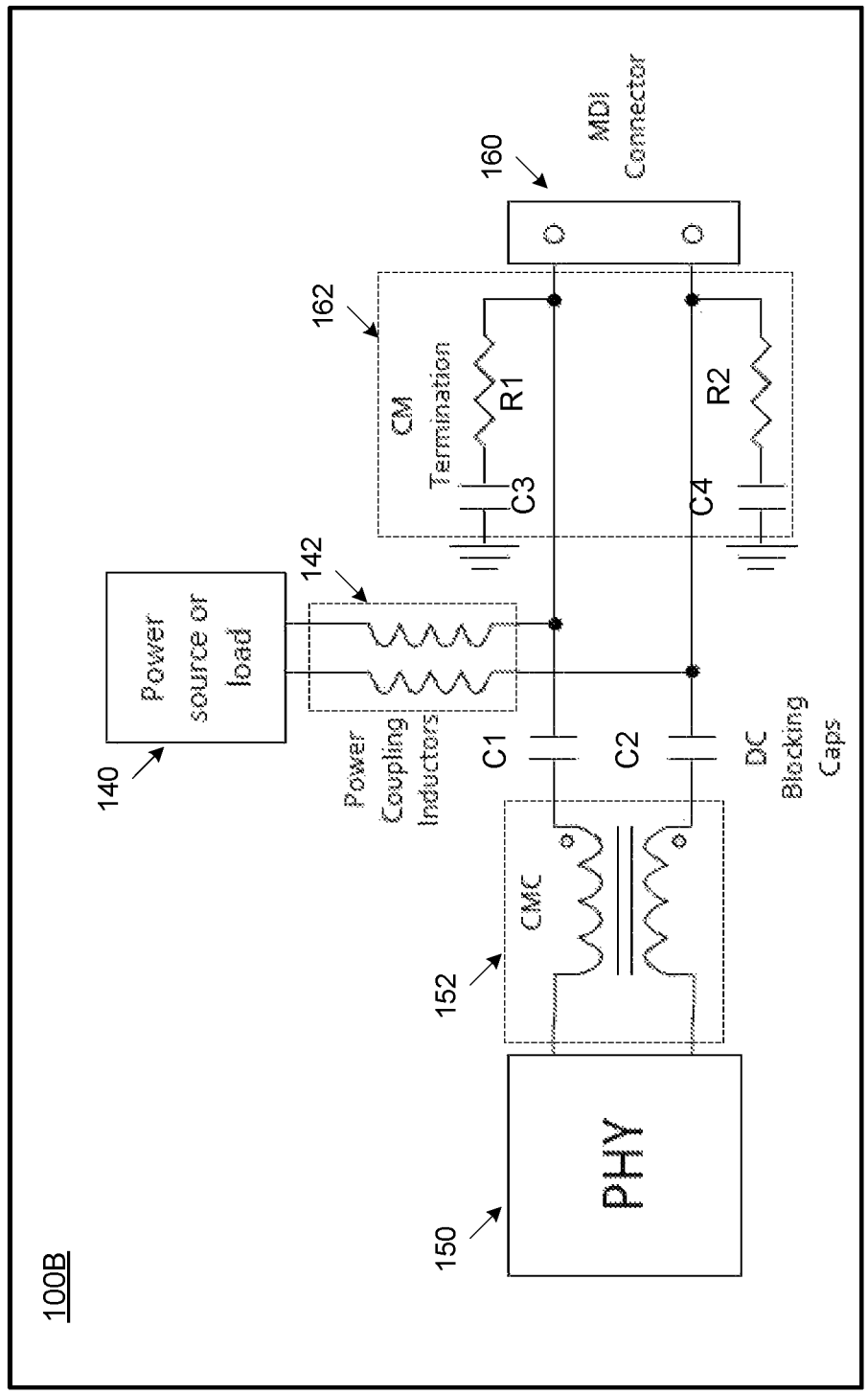
FIG. 1B illustrates an example of a power over data-line (PoDL) injection circuit with balanced coupling inductors in accordance with one or more implementations.

FIG. 1B illustrates an example of a power over data-line (PoDL) injection circuit 100B with balanced coupling inductors in accordance with one or more implementations of the subject technology. The PoDL injection circuit 100B includes a power source or load 140, a first coupling component 142, a second coupling component 152, a PHY circuit 150, and an interface 160. The power source or load 140 represents a power source, such as the power source 116 of FIG. 1A, when the PoDL injection circuit 100B represents a power-source circuit (e.g., 110 of FIG. 1A). Otherwise, when the PoDL injection circuit 100B represents a load or a power-receiving circuit (e.g., 120 of FIG. 1A), the power source or load 140 represents a powered device, such as the powered device 126 of FIG. 1A. For the purpose of the discussion hereinafter, the PoDL injection circuit 100B is considered to be a power-source circuit and the power source or load 140 is referred to as a power source 140.

The power source 140 can provide DC power at a number of voltage levels, for example, 12V, 24V, and 48V. In some aspects, the coupling component 142 includes a pair of coupling inductors that is connected between output ports of the power source 140 and the ports of the interface 160 and isolates the power source from the data signals. The pair of coupling inductors provides low impedance for DC power and high impedance for data signals. Therefore, the coupling inductors are not supposed to affect data signals traveling between the PHY 150 and the interface 160. The values of the inductors depends on the operational frequency, for example, they can be in the 2-3 micro-Henry (µH) range for a data rate of 1 Gbps, and scale up for lower frequencies (e.g., in the 20-30 µH range for a data rate of 100 Mbps). The second coupling component 152 can be a magnetic transformer that can isolate the PHY circuit 150 from the power source 140. In some aspects of the subject technology, the PHY circuit 150 is powered by the power source 140 through another path (not shown in FIG. 1B for simplicity) other than through the first coupling component 142. In the implementation the PoDL injection circuit 100B that is commonly employed in automotive applications, for the second coupling component 152 a CMC is used. This is because for automotive applications with stringent EMC requirements over UTP cables, the CMC can have a better performance than a magnetic transformer. In this case, DC power is blocked using a pair of blocking capacitors C1 and C2, as shown in FIG. 1B.

In one or more aspects, the interface 160 is a media-independent interface (MDI) connector and is terminated at its ports using termination circuit 162 including CM termination resistors R1 and R2 and capacitors C3 and C4. The termination circuit 162 is a common-mode (CM) termination circuit that can terminate CM noise. The CM termination resistors R1 and R2 are blocked from DC current by the capacitors C3 and C4, therefore no DC power is absorbed by the termination circuit 162. Alternative circuits for CM termination with lower component counts can lead to power loss on the termination resistors.

For automotive applications, often the convenient choice for the power source is a 12V supply level for power injection. In FIG. 1B, the power source 140 injects power between CMC 152 and the cable (e.g., 130 of FIG. 1A, not shown in FIG. 1B for simplicity). It is understood that the implementation of FIG. 1B can become problematic if the balancing condition for EMC requirement is not met by the coupling inductors 142 used for power injection. Highly balanced cables and connectors are needed to meet EMC requirements for automotive applications for both 100BASE-T1 and 1000BASE-T1 standards. Achieving balancing requirements can be practically prohibitive for this approach although not impossible theoretically. Inductors are known to be subject to significant variations, part-to-part and over a wide temperature and/or frequency range common in automotive applications. A high frequency (HF) impedance, defined as an impedance over frequencies in the frequency range of interest (e.g., as relevant to the applied data rate), is in part related to the inductance. The HF impedance is also critically related to the construction of an inductor and the effect of the parasitic capacitance at higher frequencies (e.g. in the tens of MHz range and higher). Matching HF impedance of the two inductors used in the pair of coupling inductors 142 is not trivial.

The required inductance matching is not for only the nominal value of the inductance at, for example, 100 kHz and without a DC bias. The good match between the two inductors has to be achieved under specific conditions. The specific conditions include, for example, across the frequency range of interest (e.g., at least within the spectrum of the desired signal (data)), across the temperature range of interest (e.g. –40 C to 125 C), and with the specified DC current bias. In addition to issues related to the balancing of the inductor pair, the circuit of FIG. 1B has to have an additional CMC on the power circuit side (not shown) to protect the line from common mode noise of power source, which can result in high emission. The additional CMC increases the size and cost of the circuit. The solution to the challenging balance requirement of the coupling inductors 142 used for power injection is described with respect to FIG. 2 below.

Figure 2:
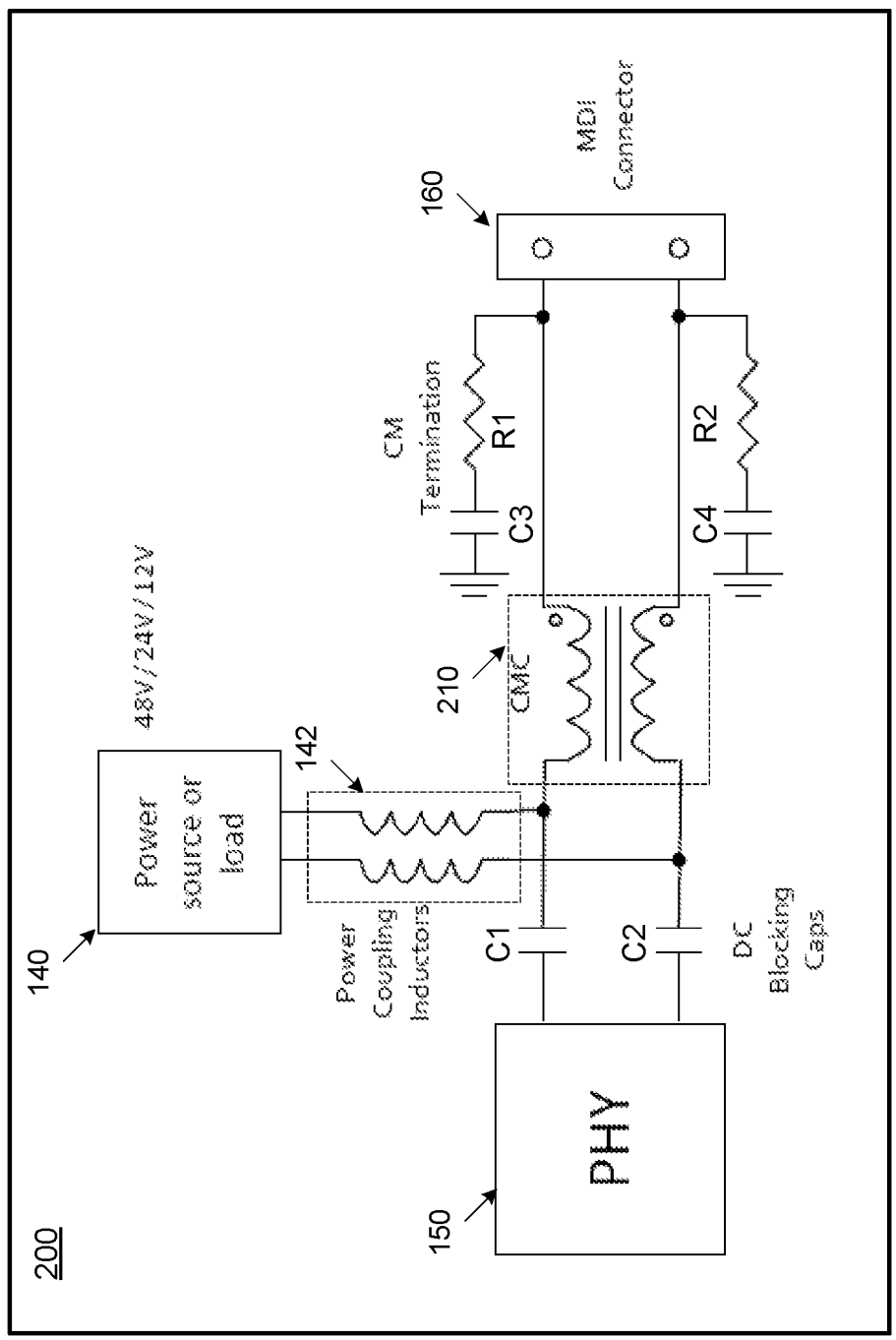
FIG. 2 illustrates an example of a PoDL injection circuit with unbalanced coupling inductors in accordance with one or more implementations.

FIG. 2 illustrates an example of a PoDL injection circuit 200 with unbalanced coupling inductors 142 in accordance with one or more implementations of the subject technology. The PoDL injection circuit 200 is an alternative circuit diagram suggested for automotive applications with UTP cables used as the transmission medium. The PoDL injection circuit 200 is for most parts similar to the PoDL injection circuit 100B of FIG. 1B, except that the first coupling component 142 is moved closer to the Ethernet device 150 (e.g., PHY) to the PHY side of the CMC 210, and the inductor imbalance does not cause significant issues with electromagnetic compatibility. For the PoDL injection circuit 200, the data signal is coded in a differential format and therefore the performance is affected by the amount of differential noise, which can be generated by passing CM noise through the unbalanced inductors of the coupling inductors 142. In the case of the PoDL injection circuit 200, due to the attenuation by the CMC 210, the CM noise is significantly attenuated before reaching the inductors of the coupling inductors 142. Similarly, the imbalance of the coupling inductors 142 does not lead to significant increase in electromagnetic emission because the CMC 210 attenuates CM signals coming from the PHY 150 side. Note that the CM signal is the result of conversion of the differential transmit data to CM by the inductors imbalance. The CM signal blocked by CMC 210 is absorbed by an internal common mode termination of PHY 150. No additional CMC is needed on the power source 140 as the same CMC 210 used on the data path is protecting the noise from power source 140.

There is another aspect of the PoDL injection circuit 200 that is different form the PoDL injection circuit 100B of FIG. 1B. In the PoDL injection circuit 200, the DC current generated by the power source 140 can pass through CMC 210 and therefore CMC 210 needs to tolerate that extra current. For some applications, the load power is small (e.g. less than 1-2 W) and a practical CMC design may tolerate the extra load current. For higher power nodes, the extra current passing through CMC may result in a higher size and/or cost CMC to avoid excessive voltage drop and other issues. One limitation, for example, comes from the requirement to keep the DC resistance (DCR) of the inductors of the coupling inductors 142 and the CMC 210 low in order to prevent the excessive DC voltage drop on these components. For automotive applications, where a nominal 12V is standard (e.g., defined within 6V and 16V), this can present a challenge without using components with low DCR, which is achieved by using relatively thick wires. The resulting inductors and CMC can thus become relatively too large. To avoid this problem, higher supply voltages are suggested to reduce current intake for the CMC 210 and the coupling inductors 142. For automotive applications, the more likely choices of voltage levels for the power source 140 are 24V and 48V.

Depending on cable type such as UTP, STP, or coaxial and some other considerations, alternative coupling circuits may be used for PoDL, as discussed in more details below.

Figure 3:
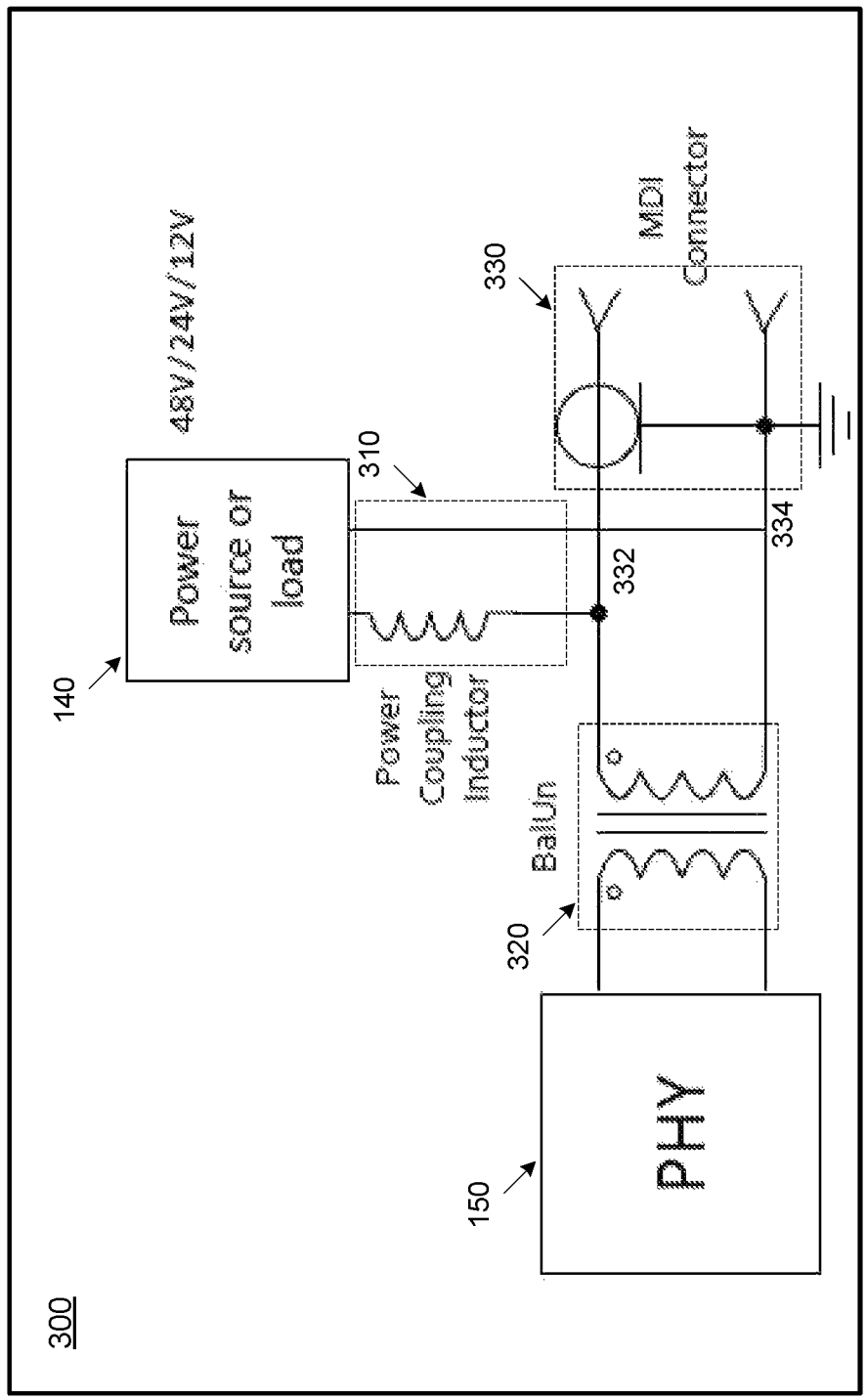
FIG. 3 illustrates an example of a PoDL injection circuit over coaxial cable in accordance with one or more implementations.

FIG. 3 illustrates an example of a PoDL injection circuit 300 over coaxial cable in accordance with one or more implementations of the subject technology. The PoDL injection circuit 300 includes a power source 140, a first coupling component 310, a second coupling component 320, an Ethernet device 150 (e.g., a PHY device), and an interface 330. The power source 140 can produce a number of voltage levels such as 12V, 24V, and 48V. The first coupling component 310 is an inductor that couples one port of the power source 140 to a port 332 of the interface 330, which can be an MDI connector for connection to a coaxial cable. The other port of the power source 140 is directly connected to the same ground potential that the ground port 334 of the interface 330 is connected to. A good grounding with substantially low impedance is used for the ground potential and therefore the common mode noise coupled to the coaxial outer layer does not affect differential signal as much compared to UTP cabling.

The second coupling component 320 is a transformer (e.g., a balun) that can convert a single-ended signal on the coaxial cable side to a differential signal needed at the Ethernet device 150.

Figure 4:
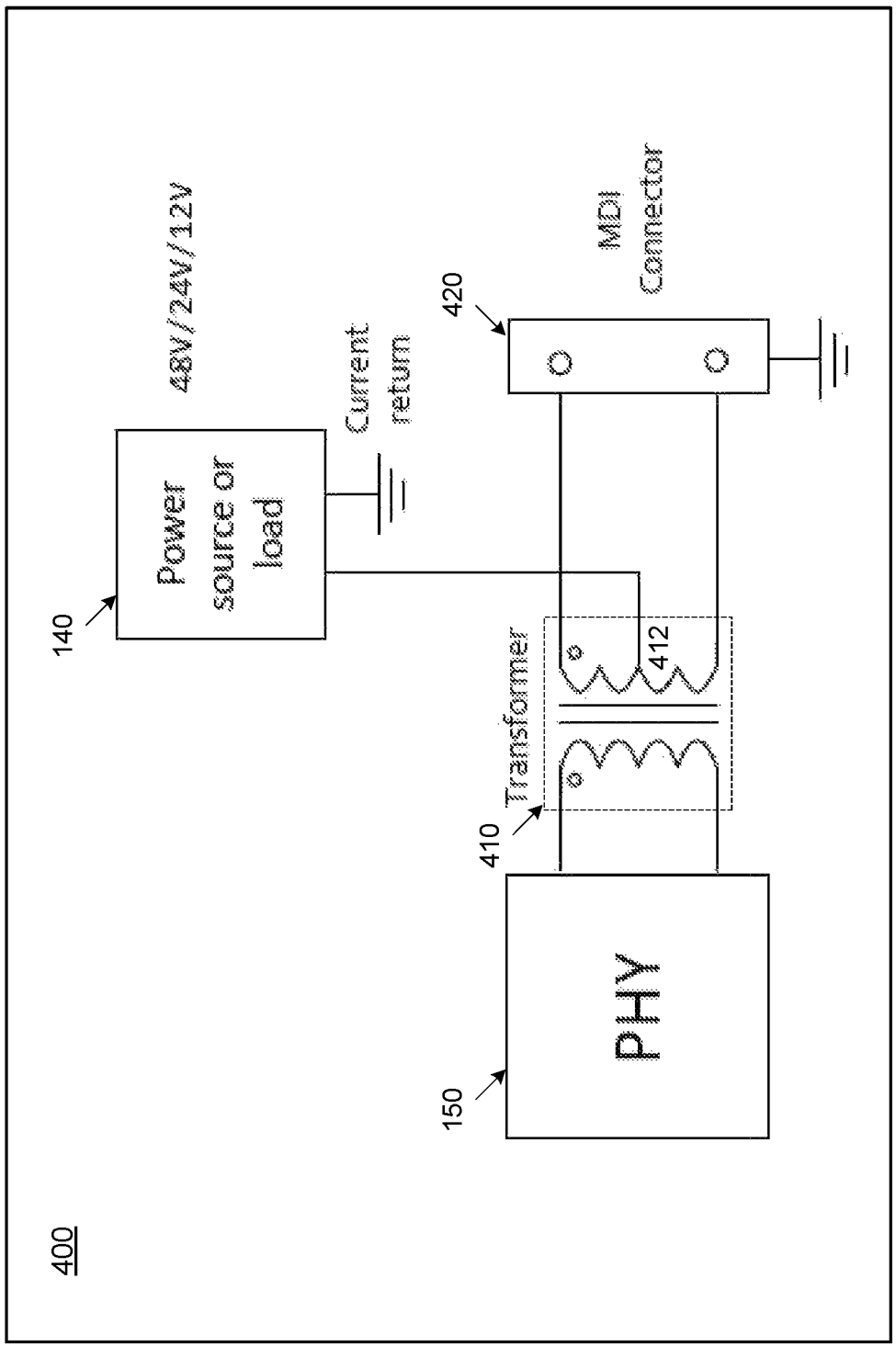
FIG. 4 illustrates an example of a PoDL injection circuit over a shielded twisted pair (STP) cable in accordance with one or more implementations.

FIG. 4 illustrates an example of a PoDL injection circuit 400 over a STP cable in accordance with one or more implementations of the subject technology. The PoDL injection circuit 400 is similar to the PoDL injection circuit 300, except that the first coupling component 310 of FIG. 300 is replaced with a short circuit and the second coupling component 320 of FIG. 3 is replaced with a transformer 410 (e.g., a CM transformer) including a middle tap 412 on the secondary winding. The power source 140 injects power as a CM signal into a STP cable (not shown for simplicity) coupled to the interface 420 (e.g., an MDI connector), and the shield of the STP cable is used for current return. A low impedance grounding is used for the MDI connector 420. The transformer 410 with the middle tap 412 is used to isolate differential signal (data) and allow injection of power as a CM signal at the middle tap 412.

Figure 5:
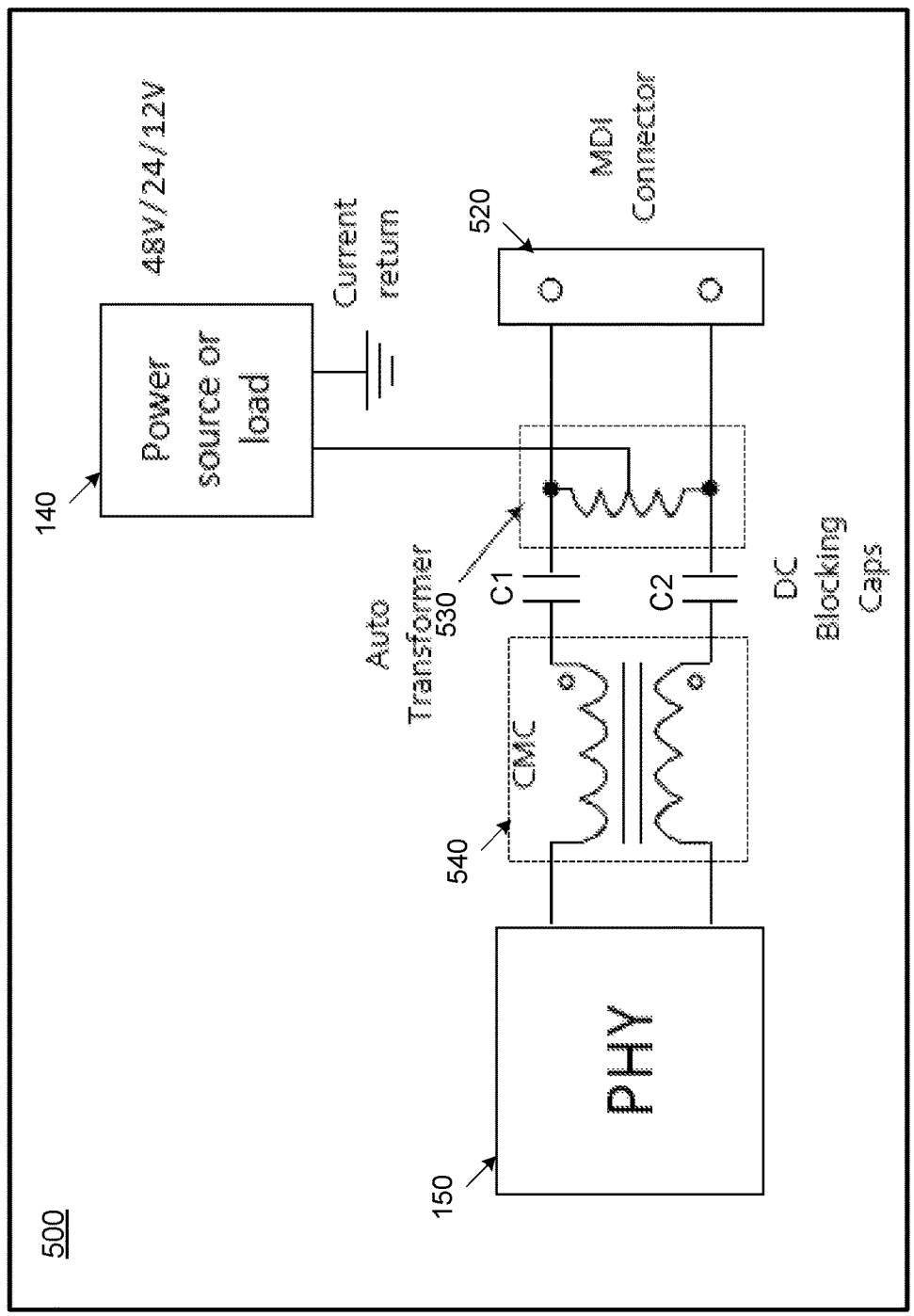
FIG. 5 illustrates an example of a PoDL injection circuit for an unshielded twisted pair (UTP) cable with an extra return-path in accordance with one or more implementations.

FIG. 5 illustrates an example of a PoDL injection circuit 500 for a UTP cable with an extra return-path in accordance with one or more implementations of the subject technology. The PoDL injection circuit 500 is a solution for UTP cables when the car body or an additional wire can be used for current return. The PoDL injection circuit 500 is similar to the PoDL injection circuit 400 of FIG. 4, except that the transformer 410 of FIG. 4 is replaced with an auto-transformer 530 coupled via DC blocking capacitors C1 and C2 and optionally through a CMC 540 to the Ethernet device 150 (e.g., a PHY device). In the PoDL injection circuit 500, the power source 140 injects power as a CM signal into the data line using the autotransformer 530. The interface 520 is an MDI connector that couples the power source 140 to another Ethernet device via a UTP cable.

Figure 6:
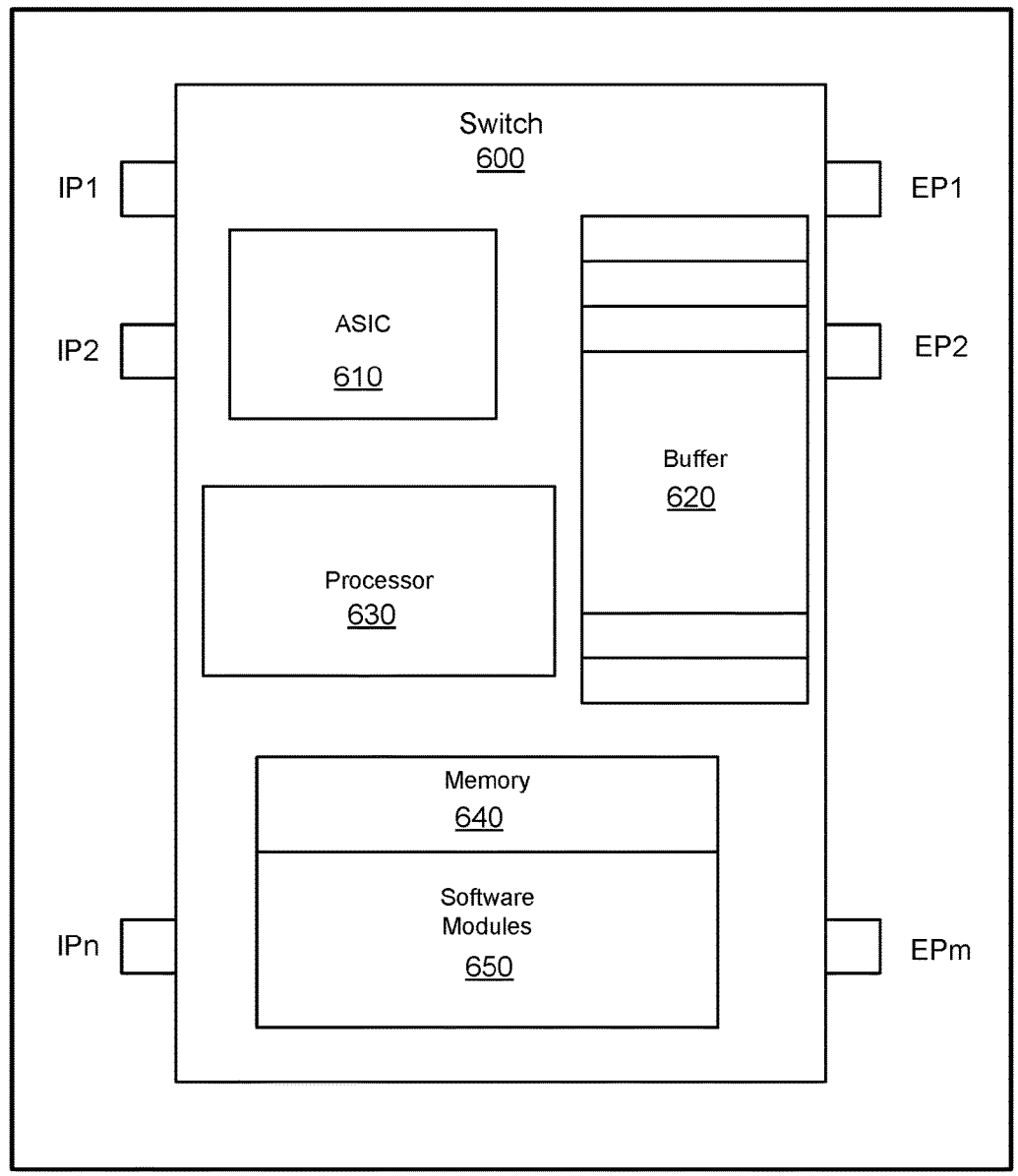
FIG. 6 illustrates an example of a network switch for PoDL injection in accordance with one or more implementations.

FIG. 6 illustrates an example of a network switch 600 for PoDL injection in accordance with one or more implementations of the subject technology. The network switch can be the Ethernet device 150 of FIGS. 1B through 5, which is powered by a power source (e.g., 140 of FIGS. 1B through 5) and facilitates for the power source 140 to inject power to one or more other Ethernet devices (e.g., a desktop or a lap top computer, a set-top box, a TV, a Radio, or other media devices). The network switch 600 includes a number of ingress (input) ports IP1-IPn and multiple egress (output) ports EP1-EPm. In one or more implementations, one or more of the ingress ports IP1-IPn can receive a data packet from another switch or and endpoint device of the network. In some aspects, one of the input ports IP1-IPn can be used to receive power over data from another Ethernet device, and one or more output ports EP1-EPm can be used to inject power to a transmission media (e.g., cable) for delivery to another Ethernet device. The network switch 600 further includes a hardware component such as an application specific integrated circuit (ASIC) 610 (which in some embodiments can be implemented as a field-programmable logic array (FPGA)), a buffer 620, a processor 630, memory 640, and a software module 650.

In some implementations, the ASIC 610 can include suitable logic, circuitry, interfaces and/or code that can be operable to perform functionalities of a PHY circuit. The buffer 620 includes suitable logic, circuitry, code and/or interfaces that are operable to receive and store and/or delay a block of data for communication through one or more of the egress ports EP1-EPm. The processor 630 includes suitable logic, circuitry, and/or code that can enable processing data and/or controlling operations of the network switch 600. In this regard, the processor 630 can be enabled to provide control signals to various other portions of the network switch 600. The processor 630 also controls transfers of data between various portions of the network switch 600. Additionally, the processor 630 can enable implementation of an operating system or otherwise execute code to manage operations of the network switch 600.

The memory 640 includes suitable logic, circuitry, and/or code that can enable storage of various types of information such as received data, generated data, code, and/or configuration information. The memory 640 includes, for example, RAM, ROM, flash, and/or magnetic storage. In various embodiment of the subject technology, the memory 640 may include a RAM, DRAM, SRAM, T-RAM, Z-RAM, TTRAM, or any other storage media. The memory 640 can include software modules 650 that when executed by a processor (e.g., processor 630) can perform some or all of the functionalities of the ASIC 610. In some implementations, the software modules 650 include codes that when executed by a processor can perform functionalities such as configuration of the network switch 600. In one or more implementations, one or more of the multiple egress ports EP1-EPm can be used to provide PoDL through a transmission medium (e.g., a cable) coupled to that egress port to another Ethernet device.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature of the subject technology.

The computer-readable storage medium can be any storage medium that can be read, written, or otherwise accessed by a general purpose or special-purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that certain illustrative blocks, modules, elements, components, and methods described herein (e.g., with respect to FIG. 6) may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A circuit for power over data line (PoDL) injection, the circuit comprising:
a power source configured to provide one or more DC voltage levels;
a first coupling component configured to couple the power source to an interface for coupling to a transmission medium; and
an Ethernet device coupled through a second coupling component to the interface,
wherein:
the first coupling component is a balanced component, and
the Ethernet device is isolated from the power source via a pair of DC blocking capacitors, wherein the pair of DC blocking capacitors are separate from the first coupling component and are connected between the first coupling component and the second coupling component.

2. The circuit of claim 1, wherein the first coupling component comprises a pair of matched inductors, and wherein matching between the pair of matched inductors is achieved over a frequency and temperature range of interest and with a predetermined DC voltage level.

3. The circuit of claim 1, wherein the second coupling component comprises a common-mode choke (CMC) coupled at first terminals to the Ethernet device and at second terminals to the pair of DC blocking capacitors.

4. The circuit of claim 1, wherein the transmission medium comprises one of a shielded twisted pair (STP) or an unshielded twisted pair (UTP) cable, and wherein the interface comprises a medium independent interface (MDI) port.

5. The circuit of claim 1, wherein the interface is terminated using a pair of common mode (CM) terminations, each CM termination comprising a resistor connected in series with a capacitor coupled to ground potential.

6. The circuit of claim 1, wherein the Ethernet device comprises an Ethernet physical (PHY) device.

7. The circuit of claim 1, wherein the Ethernet device is powered by the power source through a path other than through the first coupling component, and wherein the one or more DC voltage levels comprise 12 Volt (V), 24V, and 48V.

8. The circuit of claim 1, wherein the transmission medium transmits DC power of the power source and data to another Ethernet device, wherein the another Ethernet device comprises an Ethernet physical (PHY) device.

9. A circuit for power over data line (PoDL) injection, the circuit comprising:
a power source configured to provide one or more DC voltage levels;
a first coupling component configured to couple the power source to a second coupling component;
an interface for coupling to a transmission medium, the interface coupled through the second coupling component and the first coupling component to the power source; and
an Ethernet device coupled through the second coupling component to the interface, wherein:
the Ethernet device is isolated from the power source via a pair of DC coupling capacitors, and the second coupling component is configured to attenuate common mode (CM) noise.

10. The circuit of claim 9, wherein the first coupling component comprises a pair of inductors, and wherein the second coupling component is configured to prevent mismatching between the pair of inductors from affecting noise immunity and electromagnetic compatibility (EMC).

11. The circuit of claim 9, wherein the second coupling component comprises a common-mode choke (CMC) coupled at first terminals to the pair of DC blocking capacitors and at second terminal to the interface.

12. The circuit of claim 9, wherein the transmission medium comprises one of a shielded twisted pair (STP) or an unshielded twisted pair (UTP) cable, and wherein the interface comprises a medium independent interface (MDI) port.

13. The circuit of claim 9, wherein the interface is terminated using a pair of common mode (CM) terminations, each CM termination comprising a resistor connected in series with a capacitor coupled to ground potential.

14. The circuit of claim 9, wherein the Ethernet device comprises an Ethernet physical (PHY) device.

15. The circuit of claim 9, wherein the Ethernet device is powered by the power source through a path other than through the first coupling component, and wherein the one or more DC voltage levels comprise 12 Volt (V), 24V, and 48V.

16. The circuit of claim 9, wherein the transmission medium transmits DC power of the power source and data to another Ethernet device, wherein the another Ethernet device comprises an Ethernet physical (PHY) device.

17. A circuit for power over data line (PoDL) injection, the circuit comprising:
a power source configured to provide one or more DC voltage levels;
a first coupling component configured to couple the power source to an interface; and
an Ethernet device coupled through a second coupling component to the interface,
wherein:
the Ethernet device is isolated from the power source through at least the second coupling component, and
the interface comprises a medium independent interface (MDI) port.

18. The circuit of claim 17, wherein:
the first coupling component comprises a single inductor, and
the second coupling component comprises a balun transformer.

19. The circuit of claim 17, wherein:
the second coupling component comprises a balun transformer with a middle tap on a secondary winding ,
the first coupling component comprises a short circuit connecting a power node of the power source to the middle tap of the balun transformer, the interface comprises a medium independent interface (MDI) port.

20. The circuit of claim 17, wherein:

the second coupling component comprises a common-mode choke (CMC) coupled through a pair of blocking capacitors and an auto-transformer to the interface, the first coupling component comprises a short circuit connecting the power node of the power source to a middle tap of the auto-transformer, and the interface comprises a medium independent interface (MDI) port.

* * * * *